May 19, 1936.  A. F. VERBEEK  2,040,965
MACHINE FOR AND METHOD OF MAKING KNITTED FABRIC
Filed Jan. 29, 1935  4 Sheets-Sheet 1
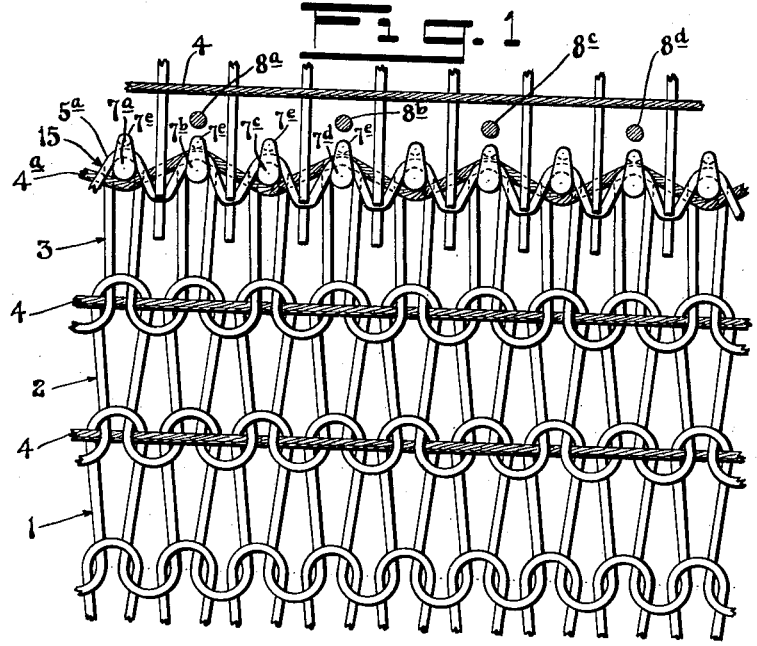
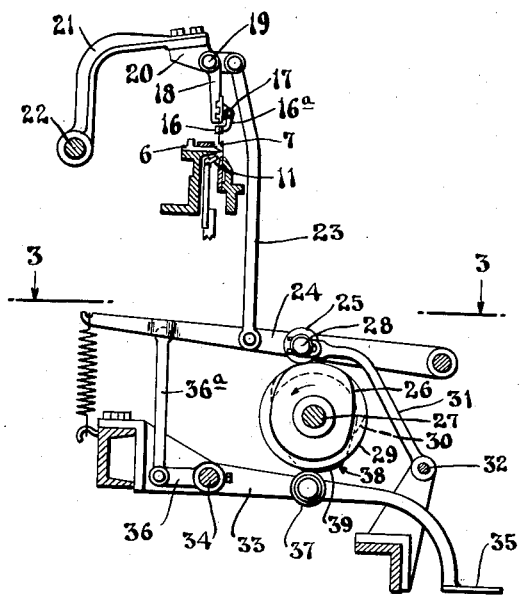
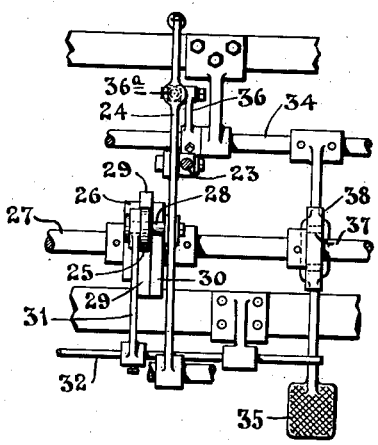
INVENTOR.
Arnold F. Verbeek
BY
his ATTORNEY.

May 19, 1936. A. F. VERBEEK 2,040,965
MACHINE FOR AND METHOD OF MAKING KNITTED FABRIC
Filed Jan. 29, 1935 4 Sheets-Sheet 2
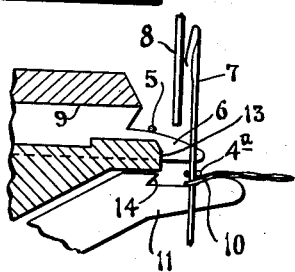
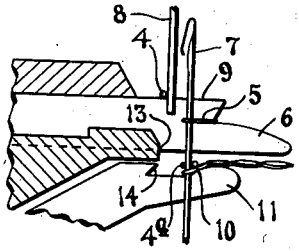
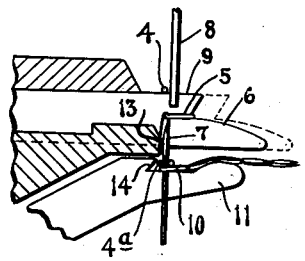
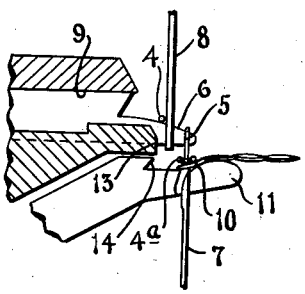
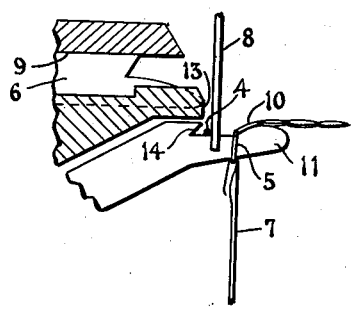
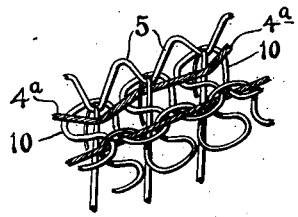
INVENTOR.
Arnold J. Verbeek
BY
his ATTORNEY.

May 19, 1936. A. F. VERBEEK 2,040,965
MACHINE FOR AND METHOD OF MAKING KNITTED FABRIC
Filed Jan. 29, 1935 4 Sheets-Sheet 3

INVENTOR.
Arnold F. Verbeek
BY
his ATTORNEY.

May 19, 1936.  A. F. VERBEEK  2,040,965
MACHINE FOR AND METHOD OF MAKING KNITTED FABRIC
Filed Jan. 29, 1935   4 Sheets-Sheet 4
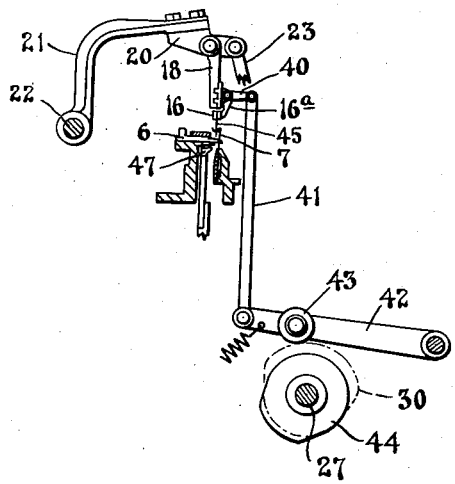
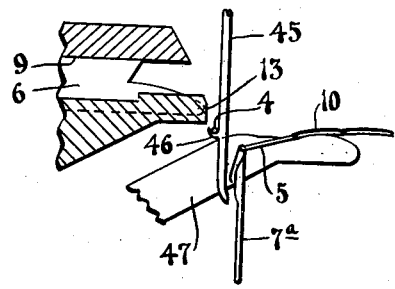
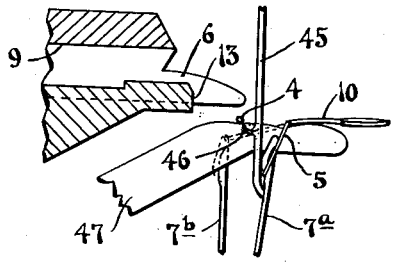
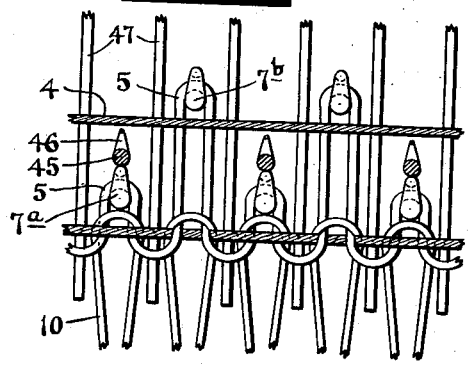
INVENTOR.
Arnold F. Verbeek
BY
his ATTORNEY.

Patented May 19, 1936

2,040,965

UNITED STATES PATENT OFFICE 2,040,965

MACHINE FOR AND METHOD OF MAKING KNITTED FABRIC

Arnold Friedrich Verbeek, Oberlungwitz, Germany, assignor to Kalio, Inc., New York, N. Y., a corporation of New York Application January 29, 1935, Serial No. 3,892
In Germany January 30, 1934

10 Claims. (Cl. 66—83)

This invention relates to a method and a machine for knitting a single layer fabric which includes transverse weft threads in addition to the usual loop formation.

One of the advantages of such fabric is that if the weft thread utilized is elastic a high degree of elasticity is imparted to the fabric. This is of value, for example, in the welt of a stocking which should fit snugly the thigh of the wearer. Elastic weft threads in the welt will insure this and, in effect, counteract the tendency of the fabric to stretch during wear. It is of equal value in any other knitted article subjected to stretching strains where snug fit is desired.

A method of incorporating the weft threads in knitted fabric and a machine for carrying out the method are shown in the accompanying drawings, of which Figure 1 is a diagrammatic view of a piece of fabric knitted in accordance with this invention;

Fig. 2 is an end view of a part of the knitting machine showing the mechanism for imparting the required motions to the weft bar and weft points;

Fig. 3 is an plan view of the mechanisms of Fig. 2 viewed as indicated by the dotted line 3—3 and arrows in Fig. 2;

Figs. 4–13 are diagrammatic illustrations of various steps in the knitting of the fabric;

Fig. 14 is an end view of a modified form of mechanism for carrying out the method of this invention;

Figs. 15 and 16 are diagrammatic illustrations of two steps of the method as performed by this modified mechanism; and Fig. 17 is a diagrammatic plan view of the fabric and mechanical parts shown and positioned as in Fig. 16.

Figure 10:
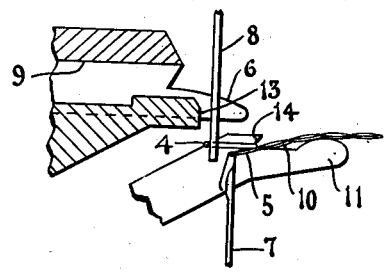

For the purposes of this specification it will be assumed that the fabric is of the usual simple interlooped formation and that the weft threads are elastic and incorporated in successive courses, but it will be understood that the invention is by no means limited to this exact construction.

The character of the fabric is shown diagrammatically in Figure 1. It consists of the usual courses 1, 2, 3 of interlooped loops into each or some of which a weft thread 4 has been woven over the top portion of each needle loop of one course and through each sinker loop of the next course.

A somewhat similar construction can be secured by utilizing the narrowing mechanism and the picot bar to temporarily remove alternate loops from the needles and laying the weft thread between them and the other loops, but this method involves a loss of knitting time for each course equivalent to that required for a narrowing operation and, in consequence, reduces the capacity of the machine. Also the weft threads are not interlocked with the loops in the same manner as by this invention and a less uniform and satisfactory fabric results.

By this invention the regular loop laying and loop developing process is not disturbed. Instead the weft thread is inserted by independent steps carried out concurrently with the development of the regular fabric loops during the regular knitting cycle.

In Fig. 4 is shown diagrammatically the position of the parts involved just after the beginning of the laying of the regular fabric thread of a course. The fabric thread 5 is shown laid upon the sinkers 6 behind needles 7. Weft points 8, of which there is one for every other needle, are also shown positioned directly behind needles 7 with their lower ends slightly below the upper edges 9 of the sinkers 6. The ordinary picot bar can be used as the weft bar if desired. The previously knitted fabric is also shown with loops 10 of the last course hanging upon the needle shanks and supported by knock over bits 11.

In Fig. 5 sinkers 6 have been advanced to kink the fabric thread 5 around the needles 7. This also brings weft points 8 between adjacent upper edges 9 of sinkers 7. As the sinkers are advanced a thread carrier lays a weft thread 4 (preferably elastic) along these upper edges 9 of the sinkers and behind the weft points 8.

In Fig. 6 the needles 7 have descended and the beards closed against presser bar 13 so that the beards will pass through the old loops 10 of the finished fabric. The new loop 5 is shown within the beard and the sinkers as having receded somewhat in the usual manner.

In Fig. 7 the needles have descended still further and sinkers 6 have continued to recede. Fabric thread 5 is now slipping off the noses of sinkers 6, and weft thread 4 has dropped from the top edges 9 of sinkers 6 on to the sinker noses. Weft points 8 have been caused to descend so as to be still interposed between the weft thread and the needles.

Fig. 8 illustrates diagrammatically the new loops of fabric thread 5 being pulled through the old loops 10 by the needles. A weft thread is also shown woven into the fabric but this should be disregarded for the present since the weft thread 4 heretofore included in this description is a different weft thread which has not yet reached the position shown. Weft thread 4 is still supported by sinkers 6, as shown in Fig. 7.

In Fig. 9 the needles 7 have descended still further and the new fabric loops 5 have been pulled completely through old loops 10. Sinkers 6 have receded still further and weft thread 4 has dropped from the sinker noses onto knock over bits 11 and lies in front of hooks 14 with which the knock over bits are provided. Weft thread 4 is still held behind the path of travel of needles 7 however, by weft points 8 which, it will be noted, have continued to descend so as to be continually interposed between the weft thread and the needles of the path thereof.

Figure 11:
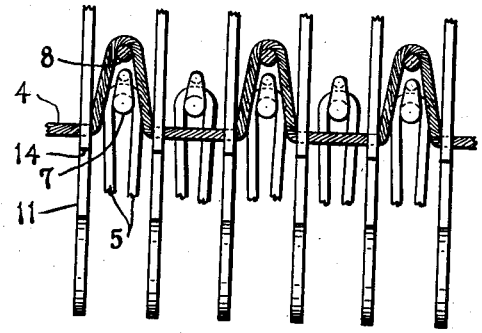

As shown in Fig. 10 the knock over bits now advance so that the hooks 14 pass by the needles to a position in front of them. This kinks weft thread 4 about the weft points 8 and adjacent knock over bits, as shown in Fig. 11 so that the weft thread now lies alternately behind and in front of the paths of successive needles. Therefore, when the needles start to rise they will pass alternately in front of and behind the weft thread.

Figure 12:
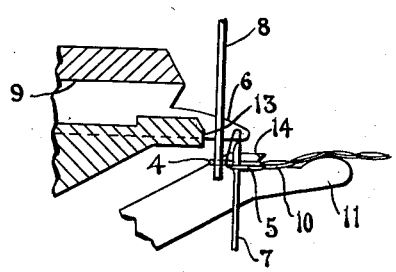
Figure 13:
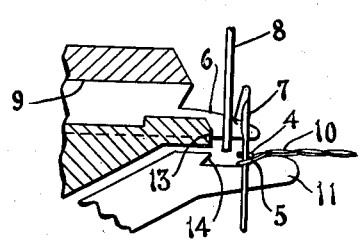

During the early part of the upward travel of the needles the position of weft points 8 and knock over bits 11 remain substantially unchanged, as shown in Fig. 12, but before the needles reach the end of their upward travel weft points 8 also rise to their original position shown in Fig. 4, releasing weft thread 4. Knock over bits 11 also recede to their original position during the upward movement of the needles as do sinkers 6 which, it will be noted, had been advanced to keep the fabric and the weft thread from rising, (see Fig. 13). The weft thread now lies directly against the needles, as shown in Fig. 1 it being, in effect, woven alternately behind and in front of successive needles. It will be noted, however, that weft thread 4 has not yet been actually worked into the fabric but simply lies in this sinuous course upon the newly knit course of loops.

During the next knitting cycle the operations described above are repeated with the same results. In addition, the weft thread 4 laid during the previous knitting cycle as described, is knitted into the fabric. To avoid unnecessary multiplication of the figures of the drawings both the old and new weft threads are shown in Figs. 4-13 so that the figures can be utilized to illustrate both knitting cycles. If it is remembered that original weft thread 4 becomes weft thread 4ª as soon as another weft thread is laid and that the newly laid weft thread assumes the numeral 4 no confusion will result. When the fabric loops 5 of the next course have been formed around the needles and sinkers as shown in Fig. 2, the various fully and partly formed loops of the old and new courses lie as shown at 15 in Fig. 1. The fully formed fabric loops which were completed by the knitting step illustrated in Fig. 11 are shown at 5, the overlying weft thread at 4ª, the newly sinkered partially formed new fabric loops at 5ª, and the newly laid weft thread at 4. The needles 7 are indicated as 7ª, 7ᵇ, 7ᶜ, and 7ᵈ, etc., the weft points as 8ª, 8ᵇ, and 8ᶜ, and the beards of the needles are shown at 7ᵉ.

When the stage in the knitting cycle represented by Fig. 5 is reached the needle beards have been closed by press edge 13 so that the needles will pass through the old loops hanging on their shanks. The beards of alternate needles 7ᵇ, 7ᵈ, etc., will also be closed against the entry of weft thread 4ª lying above the old loops. Therefore, the new fabric loops 5ª when they are pulled through the old loops 5 will also pass in front of weft thread 4ª leaving it lying on top of the corresponding old needle loops and also on top of the interlooped sides of adjacent newly formed sinker loops. As to the other needles 7ª, 7ᶜ, etc., the weft thread 4ª lies in front of them so that when the new fabric loops 5ª are pulled through the old loops 5 they will pass between the old loops and the weft thread. This results in the structure shown in Fig. 1 in which the weft thread lies over the top portions of all of the needle loops of one course and is woven through all of the interlooped sinker loops of the following course.

To perform the knitting process above described, no change in needle action from established practice is required. Therefore, the usual mechanisms, which require no description, may be utilized. For the weft bar, however, a novel motion not provided for on the standard knitting machine is necessary.

In Fig. 2 one of the weft bars is shown at 16 provided with weft points 8, one for every other needle, as described. Weft bar 16 may be mounted upon arms 16ª which are swingable upon rod 17 at each end of each machine section. Arms 18 are, in turn, rigidly attached to a shaft 19 held by brackets 20 on arms 21. Arms 21 are rigidly attached to rock shaft 22. By rocking shaft 22 in clockwise direction weft points 8 may be caused to dip in a substantial vertical plane as already described. In short, the construction, mode of attachment and motion of the weft bar and points are substantially identical with those of the usual picot bar. In fact, the picot bar can be employed as previously stated.

Motion is imparted to the pilot bar for its customary service in transferring loops from one needle to another by a lever 23 pivoted at its upper end to bracket 20 and at its lower end to a rock lever 24. Rock lever 24 is provided with a cam roller 25 engageable with picot cam 26. All of these parts are standard and may also be employed to operate the weft bar or the picot bar when used as a weft bar. However, as is well known, when picoting is being done roller 25 on rock lever 24 is engaged with cam 26 only between knitting cycles, and such engagement is effected by shogging cam shaft 27 longitudinally to move cam 26 under roller 25.

It is, of course, desirable to retain the picot motion unchanged, although it is necessary to dip the picot bar or weft bar during the knitting cycle for the purposes of this invention. By this invention the same picot motion, with the exception of picot cam 26, may be utilized, by mounting roller 25 so that it can be slid upon its shaft 28 so that it can be engaged with another cam 30. When in one position, shown in Fig. 3, roller 25 is engageable with the picot cam 26. When cam shaft 27 is shogged so as to disengage it from cam 26, an idle cam 29 moves under the roller and when the weft points are to be operated during the knitting cycle, as above described, the roller is shifted to weft cam 30 by sliding it upon its shaft 28.

Shifting of roller 25 upon its shaft 28 may be effected by means of forked shifting arm 31 engaging a collar on roller 25 and attached to a shift rod 32 forming a part of the usual linkage of a pattern chain mechanism which may be standard in all respects and, therefore, is neither shown nor described.

Since there are as many weft point bars as there are sections in the machine and since they and their supports are heavy the shifting of roller 25 would be difficult if it were burdened with this great weight. Consequently, means is provided for lifting roller 25 slightly from the cam when the shift is to be made. This means is largely standard on the regular knitting machine and consists of a lever 33 fixed to rock shaft 34 and provided with a foot treadle 35. To shaft 34 is also attached a lever 36 to which is fulcrumed a link 36ᵃ connecting it with rock lever 24. By stepping on treadle 35 lever 24 may be raised sufficiently to lift roller 25 from its cam. This operation may also be performed by providing lever 33 with a roller 37 engageable with a cam 38 upon the cam shaft, the cam being generally circular but having a slight lift 39 over one portion of its surface sufficiently high and sufficiently long to rock lever 24 slightly and, consequently, to raise roller 25 slightly from its cam, just before and during the shift. There is no need of shifting roller 37 from cam 38 at any time because the cam has no effect upon the weft bar and points, except at one limited period of the knitting cycle where a very slight lift is caused, this point always being when the weft points are in their raised position and are not operating.

For knitting machines having knock over bits without hooks other means must be provided for positioning the weft thread with respect to the needles as described. This means may take the form of an attachment or addition to the device of Figs. 2 and 3, shown diagrammatically in Figs. 14-16. As shown it consists of an arm 40 projecting from weft bar arm 16ᵃ and pivotally connected to a lever 41 which, in turn, connects with a rock lever 42. Rock lever 42 is provided with a cam roller 43 engageable with a cam 44 on the cam shaft. Whenever rock lever 42 is swung up by the cam the weft bar 16 and the weft points will be swung outwardly.

As shown in Fig. 14 this will occur only when cam 26 permits weft points to dip. At other times cam roller 43 will be lifted from cam 44 through the lifting of the weft bar and points by cam 26. Weft points 45 in this form of the invention resemble those already described, with the exception that each is provided with a rearwardly extending hook 46.

The positions and operation of these modified weft points during the initial stages of the knitting cycle are the same as those heretofore described, with the exception that the weft thread 4, when laid, is deposited in hooks 46 which are so positioned upon weft points 45 that at that time the tips of the hooks project slightly above the top edges of sinkers 6 to form a sort of channel for the weft thread. When the weft points descend substantially as already described, their descent is so timed that the weft thread remains in hooks 46 and is carried down in them substantially onto the knock over bits 47 past the retracted sinkers 6 as shown in Fig. 15. A slight further descent of weft points 45 will permit knock over bits 47 to lift the weft thread out of hooks 46 whereupon the working portion of cam 44 comes into action upon roller 43 to swing rock lever 42 upward and through it to rock the weft bar and weft points forward. Since the weft points lie behind alternate needles the result is that alternate needles will be sprung forward as shown in Fig. 16.

At the beginning of the upward movement of the needles weft points 45 remain in contact with them until the tops of the needles have passed above weft thread 4. Shortly thereafter weft points 45 will also start to ascend as heretofore described, hooks 46 clearing weft thread 4 and leaving it lying on the knock over bits, as shown in Fig. 16. The needles 7ᵃ which have been sprung forward by the weft points will pass in front of weft thread 4, the remaining needles 7ᵇ which have not been so sprung will pass behind the weft thread 4 as best shown in Fig. 17. Consequently, when the knitting cycle has been completed and the various parts have assumed their starting positions weft thread 4 will be woven in front of and behind successive needles in a manner identical to that produced by the mechanism originally described and as shown in Figure 1.

During the following knitting cycle the weft thread is worked into the fabric exactly as heretofore described, since the action of weft points 45 upon the needles is delayed until the new loops have been pulled through the old.

The exact timing and operation of the various parts of both the mechanisms described must necessarily be left to the user, but it is well within the skill of those familiar with the art to do this under the guidance of this discription.

The result of the knitting method described herein and as performed by these two mechanisms or any other suitable device is a fabric having greatly increased transverse elasticity so that a snug fit is assured and also greater comfort since it becomes unnecessary to reduce the size drastically to insure proper fit.

Figure 18:
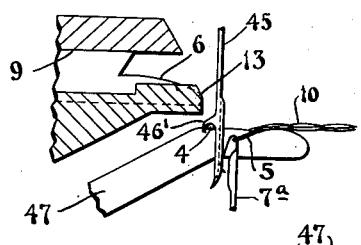
Figs. 18 and 19 are diagrammatic illustrations of two steps of the method as performed by another modification of the mechanism.
Figure 19:
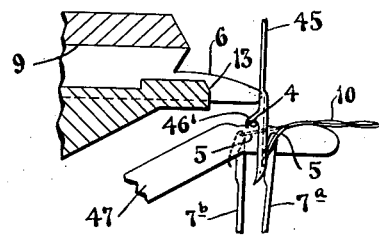
Figure 20:
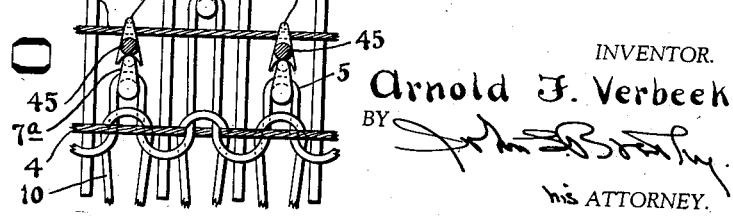
Fig. 20 is a diagrammatic plan view of the fabric and mechanical parts shown and positioned as in Fig. 19.

A further modification of the device is shown in Figs. 18 to 20 in which hooks 46' are turned downwardly. The operation of this modified form is substantially the same with the exception that the hooks overlie weft thread 4 and will definitely carry the weft thread downward and forward. In this way the proper positioning of the thread is more certain and needles 7ᵃ need no be sprung so far out of line, hooks 46' rising directly from the thread.

I claim:

1. In a flat knitting machine having hooked knock over bits, means for preventing a weft thread laid behind alternate needles for making contact with those needles during the descent of the needles, said means also cooperating with said hooked knock over bits to position said weft thread alternately in front of and behind the paths of successive needles when said needles are substantially in their lowest position and to maintain said weft thread in said position during the early stages of ascent of the needles.

2. In a flat knitting machine a weft bar provided with weft points depending downwardly behind alternate needles with their lower ends somewhat below the top edges of the sinkers, means for lowering said weft points during the descent of the needles until the lower ends of said points are slightly below the tops of the knock over bits, for maintaining said weft points in said last mentioned position until said needles have ascended above said knock over bits, and for raising said weft points to the first mentioned position during the remainder of the upward ascent of the needles.

3. In a flat knitting machine a weft bar provided with weft points depending downwardly behind alternate needles, each of said weft points being provided with a groove adapted to receive the beard of a needle and with a rearwardly extending, upwardly opening hook positioned adjacent the upper end of said groove.

4. In a flat knitting machine a weft bar provided with weft points depending downwardly behind alternate needles, each of said weft points being provided with a rearwardly extending, upwardly opening hook adjacent its lower end, and means for rocking said weft points forward to engage alternate needles and to spring them forward out of normal alignment when said needles are in substantially their lowest position and to maintain said needles so sprung during the early stages of their ascent.

5. In a flat knitting machine provided with picot points and means for operating them between knitting cycles to transfer loops from some of the needles to adjacent needles, means for also operating said picot points during a knitting cycle which consists of a cam on the same cam shaft as the picot cam and a roller slidably mounted so as to be engageable with either said picot cam or said other cam.

6. In a flat knitting machine provided with picot points and means for operating them between knitting cycles to transfer loops from some of the needles to adjacent needles, means for also operating said picot points during a knitting cycle which consists of a cam on the same cam shaft as the picot cam and a roller slidably mounted so as to be engageable with either said picot cam or said other cam, and means for automatically engaging said roller with said other cam during a knitting cycle.

7. In a flat knitting machine provided with a bank of needles, means associated with alternate needles and engageable with a weft thread laid behind said needles to prevent said weft thread from making contact with the needles during the descent of the needles and also during the initial stages of the subsequent ascent of the needles, and means for removing said last mentioned means from weft thread engaging position during the remainder of the ascent of the needles.

8. The method of making a knitted fabric upon a flat knitting machine which consists of forming a complete course of loops upon the shanks of the needles and laying a weft thread upon the knocking-over bits behind the needles all during the downward movement of the needles, then springing alternate needles forward and simultaneously moving the weft thread to a position above and between the sprung and unsprung needles, moving the needles upward sufficiently to fence in the weft thread, unspringing the sprung needles, forming a new complete course of loops upon the needles and then pulling the new course through the previously formed course of loops.

9. In a flat knitting machine having a bank of needles, a weft bar provided with weft points engageable with alternate needles to spring them out of normal alignment, each of said weft points being provided with a downwardly and rearwardly extending hook adapted to guide a weft thread laid behind the needles into a position between the sprung and unsprung needles.

10. The method of making a knitted fabric upon a flat knitting machine which consists of laying a fabric yarn progressively behind each successive needle followed immediately by the laying of a weft yarn also progressively behind each successive needle, developing a fabric yarn loop upon each needle during its downward movement of the needles, the weft yarn being maintained behind the needles and then during the initial upward movement of the needles displacing the portions of said weft yarn lying behind alternate needles to a position in front of those needles, completing the knitting cycle and then forming another course of fabric yarn loops and then pulling them through the previously formed course of fabric yarn loops.

ARNOLD FRIEDRICH VERBEEK.